Figure 1:
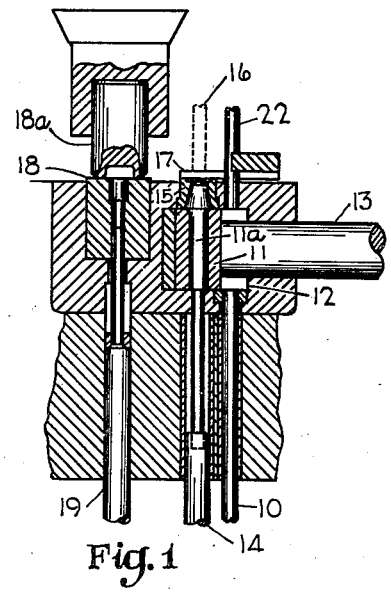

Oct. 15, 1935.    N. W. CUMMINS    2,017,341

METHOD OF MAKING BLANKS

Filed Dec. 28, 1931

Inventor
NORMAN W. CUMMINS.

By John L. Milton
Attorney

Patented Oct. 15, 1935

2,017,341

UNITED STATES PATENT OFFICE 2,017,341

METHOD OF MAKING BLANKS

Norman W. Cummins, Louisville, Ky., assignor to The National Machinery Company, Tiffin, Ohio, a corporation of Ohio Application December 28, 1931, Serial No. 583,421

5 Claims. (Cl. 10—27)

This invention relates to an added step, made incidental in a method of making blanks for screws, bolts, pins and the like, by the well known percussive action of punches and dies and the main object is to effect a saving of the cost of drawing or extruding wire from the rough to the finished stock and is represented by the difference in price between bright and finished relatively high priced cold drawn or extruded steel wire stock and low priced stock produced by the hot methods and designated as hot wire stock. At the present time the former is quoted at two dollars and twenty cents per hundred and the latter at one dollar and fifty-six cents, therefore, the present contemplated saving amounts to sixty-four cents per hundred pounds. This statement is not to be construed as limiting the application of this method of fabricating hot wire stock into cold formed products to ferrous metals alone as it is correspondingly or equally effective when working non-ferrous metals.

Instead of starting with the hot wire stock and extruding or drawing the entire length of the one piece of stock performed in a regularly organized conversion mill and then transferring the finished bright stock to a cold header where it is progressively cut up into short lengths and formed into blanks by any of the well known systems, this new method starts with the hot wire stock disposed for feeding directly into a specially prepared cold header provided for executing the method. Means are provided for reducing and finishing the diameter of the hot wire stock of irregular diameters to one suitable for fabricating into lengths concurrently with the upsetting operation. The wire can be extruded and the length for the blank severed and transferred to the forming dies or the hot wire stock can be severed into predetermined lengths from an indeterminate length and then reduced in diameter and the next step will be to transfer it to the dies for the upsetting operation.

This invention may be further briefly summarized as a method of producing accurate screw blanks directly from hot wire stock by a combination of extrusion and upsetting by percussive action, which will be described in the specification, the apparatus employed illustrated in the drawing, and set forth in the appended claims. The present invention constitutes a variation of the method and apparatus disclosed and claimed in its broader aspects in the co-pending application of John H. Friedman, Serial No. 723,933, filed May 4, 1935.

Figure 3:
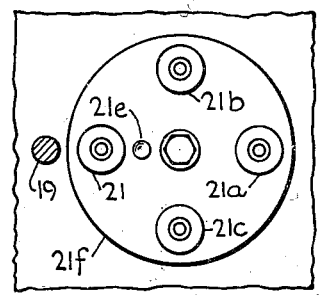
Figure 2:
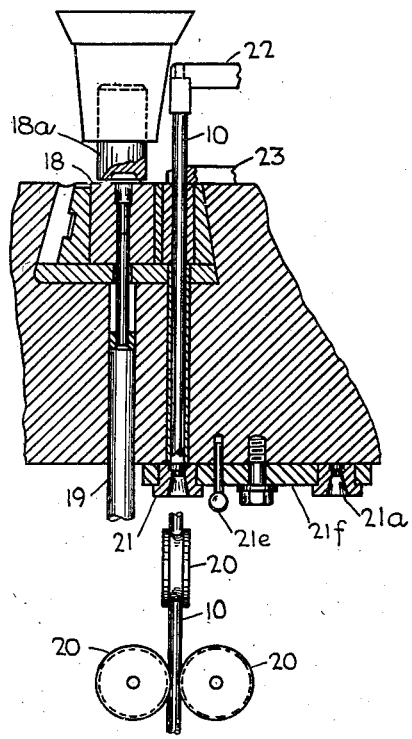

In the accompanying sheet of drawings, Figure 1 diagrammatically represents an embodiment of an apparatus for cutting off sections of the hot wire stock and transferring it for extruding and completing the blank. Fig. 2 is also a diagrammatic representation of a set of tools for handling hot wire stock by first extruding same and then cutting it off and transferring it for finishing. Fig. 3 is an elevation of the multiple extrusion die carrier mounted on a portion of the frame of the cold header. The figures shown have been selected arbitrarily and are not to be regarded as a necessary or even preferred method as the spirit of this invention resides in utilizing low priced hot wire stock and conditioning it for the production of blanks concurrently with the usual operation rather than in a selected set of tools.

According to my invention I start with hot wire stock or a length of wire indicated at 10 on Figures 1 and 2 and feed it forward by the usual methods. In Fig. 1 a section of the stock is cut off by die 11 which reciprocates in slide 12 by rod 13 which travels from a position aligned with stock 10 after it is fed forward through opening 11a against stop 22, after severance it is then transferred to the position shown in the drawing when the stock is forced by pusher rod 14 through extruding die 15 where it is accurately sized and delivered into position as shown by dotted lines 16 where it is caught by fingers 17 of the conventional type. From this position it is transferred to alignment with the upsetting dies 18, 18a which reciprocate as usual and are opened for the reception of the blank. After the blank has been struck and formed whether it be of the type shown or otherwise it is finally ejected by rod 19 according to the usual procedure.

In Fig. 2 the hot wire stock is fed through a plurality of rolls represented by 20, 20 geared to the feed mechanism and so organized that the rod will be pushed through extruding die 21 where it is sized and advanced against stop 22 to determine the length where cutter 23 severs the predetermined length and transfers it to alignment with forming dies 18, 18a after which operation the ejector 19 removes the blank.

In Fig. 3 the extruding die holder 21f is shown carrying a plurality of dies which are provided for the purpose of quickly changing that part of the apparatus which is most likely to show the first signs of wear. It will be seen that by removing index pin 21e, carrier 21f can be rotated in order that any one of the dies 21, 21a, 21b, 21c can be brought into alignment when pin 21e is replaced. This feature is of particular service when a required accuracy is to be maintained and it enables the operator to easily keep the product within limits and to make the change without necessity of stopping the crank and ram. And only a few heading operations need be missed to permit the change. The feed mechanism for rolls 20 can be thrown out of engagement, the extruding dies changed and feed mechanism restored, all accomplished in a very brief period of time.

In brief, therefore, by the method above described hot wire stock is converted into cold extruded or the equivalent of cold drawn products as an incidental operation and thereby eliminates the expense and elaborate equipment necessary for conversion by the present accepted methods, the economies and other advantages being apparent, further, means are provided for more accurately keeping the product to a standard diameter which in itself is a valuable feature.

While the method dealt with herein is primarily directed to fabricating blanks directly from hot wire stock, special attention is directed to the practicability of utilizing the teachings of this invention for processing bright wire stock produced by any of the cold processes that is at variance from accepted standards. Due to errors, oversize bright wire is frequently produced which would ordinarily require re-processing, or bright wire of a wide degree of variance with a related low production cost could be made intentionally with a view of effecting economy available by this new method, even though it may be of a lesser degree.

Solid dies are used in the drawing, however, open dies can be employed, many variations in tools apparatus as well as in sequence of operation can be indulged without departing from the spirit of the invention therefore, I wish to be limited only by the appended claims.

I claim:

1. The method of producing a cold upset formed product from a hot wire stock of indeterminate length in a unitary machine wherein a portion of said stock is extruded to a given uniform diameter throughout its entire length by pushing said portion through a sizing die in a separate operation prior to severing, to form a blank which is subsequently operated upon to form the product before being expelled from said machine.

2. The method of producing a cold upset formed product from a hot wire stock of indeterminate length in a unitary machine wherein a portion of said stock is extruded to a given uniform cross sectional area throughout its entire length by pushing said portion through a sizing die in a separate operation prior to severing, to form a blank which is subsequently severed and operated upon to form the product before being expelled from said machine.

3. The method of producing swaged blanks, in a unitary machine, which comprises intermittently feeding, by the feed mechanism of said machine, a predetermined length of substantially round rod-stock of indefinite length and having a greater cross-sectional area than the cross sectional area of the body of the finished blanks, and simultaneously with said feed pushing said stock through a sizing die to reduce the cross-sectional area of the entire length of the stock so fed, to a given uniform diameter, successively cutting off sections of the reduced stock and transferring said sections transversely to a punch and die and swaging the cut sections by exerting pressure longitudinally thereon; said operations being completed before the product is delivered from said machine.

4. A unitary machine for producing a cold formed product directly from crude rod stock of indeterminate length, means for employing the feed mechanism of said machine for pushing sections of said stock through an independent sizing die located between the feed means and the cut-off means of said machine; means for successively transversely cutting off portions of said stock; means for transferring same to other instrumentalities for further treatment before being delivered from said machine, each of the said three means being an organized part of said unitary machine.

5. The method of producing a cold upset formed product from wire stock of indeterminate length in a unitary machine wherein a portion of said stock is reduced to a given uniform diameter throughout its entire length by forcing said portion through a stationary sizing die in a separate operation prior to severing, and severing said stock to form a blank which is subsequently operated upon to form the product before being expelled from said machine.

NORMAN W. CUMMINS.